US008285123B2

(12) United States Patent
Yuasa (10) Patent No.: US 8,285,123 B2
(45) Date of Patent: Oct. 9, 2012

(54) PROGRAM RECORDING RESERVATION SYSTEM, RECORDING APPARATUS, AND CONTROLLER APPARATUS

(75) Inventor: Naoki Yuasa, Chiba (JP)

(73) Assignee: Sony Corporation, Tokyo (JP)

( * ) Notice: Subject to any disclaimer, the term of this patent is extended or adjusted under 35 U.S.C. 154(b) by 1223 days.

(21) Appl. No.: 11/550,514

(22) Filed: Oct. 18, 2006

(65) Prior Publication Data

US 2007/0110394 A1    May 17, 2007

(30) Foreign Application Priority Data

Oct. 27, 2005    (JP) .................................. 2005-313418

(51) Int. Cl.
*H04N 5/76*    (2006.01)

(52) U.S. Cl. ........ 386/294; 386/248; 386/291; 386/295; 725/40; 725/44; 725/50; 348/734

(58) Field of Classification Search .................... 386/46, 386/83, 95, 124–126, 200, 230, 239, 241, 386/248, 291–299; 348/734; 725/40, 44–50
See application file for complete search history.

(56) References Cited

U.S. PATENT DOCUMENTS

| | | | | |
|---|---|---|---|---|
| 6,584,272 B1* | 6/2003 | Fukushima et al. | ............ | 386/46 |
| 2002/0172496 A1* | 11/2002 | Gunji et al. | .................... | 386/46 |
| 2002/0180894 A1* | 12/2002 | Okajima et al. | ............... | 348/734 |
| 2003/0088872 A1* | 5/2003 | Maissel et al. | .................. | 725/46 |
| 2003/0152359 A1* | 8/2003 | Kim | ................................ | 386/46 |
| 2004/0028377 A1* | 2/2004 | Inakura | ........................... | 386/68 |
| 2004/0042761 A1* | 3/2004 | Miyazaki | ........................ | 386/46 |
| 2005/0259965 A1* | 11/2005 | Ishito | .............................. | 386/94 |
| 2006/0239642 A1 | 10/2006 | Yuasa et al. | | |

FOREIGN PATENT DOCUMENTS

| | | |
|---|---|---|
| JP | 2003-78851 | 3/2003 |
| JP | 2005-94624 | 4/2005 |
| JP | 2005-244372 | 9/2005 |
| JP | 2005-244576 | 9/2005 |

OTHER PUBLICATIONS

U.S. Appl. No. 11/550,161, filed Oct. 17, 2006, Yuasa.
U.S. Appl. No. 13/399,344, filed Feb. 17, 2012, Yuasa.

* cited by examiner

*Primary Examiner* — Thai Tran
*Assistant Examiner* — Mishawn Dunn
(74) *Attorney, Agent, or Firm* — Oblon, Spivak, McClelland, Maier & Neustadt, L.L.P.

(57) ABSTRACT

A program recording reservation system includes a recording apparatus including a recorder for recording broadcast programs; and a remote controller for setting a recording reservation for a broadcast program to be recorded by the recorder of the recording apparatus. There are provided a recording management section for obtaining a remaining recordable capacity, an average recording bit rate, a recording duration of a program, and the recording mode of the program, for computing a necessary recording capacity, for comparing the total sum of the necessary recording capacities of programs with the remaining recordable capacity, and for allowing the predetermined operation to be continued; a display section for displaying a message of an insufficient remaining recordable capacity of the recorder and first, second, and third choices; and an operation section for stopping the predetermined operation, for editing or deleting a program, and for continuing the predetermined operation.

12 Claims, 8 Drawing Sheets

| SCREEN FOR EDITING AND DELETING REGISTERED RESERVATIONS ||||||||
|---|---|---|---|---|---|---|---|
| LIST OF REGISTERED RESERVATIONS ||||||||
| C1 | C2 | C3 | C4 | C5 | C6 | C7 | |
| SEQ | TITLE | CHANNEL | RESERVATION YEAR, MONTH, AND DATE | START TIME | END TIME | RECORDING MODE | CHECK DELETE |
| 1 | DDD | 5 | 2005/11/05 | 10:00 | 10:54 | HIGH QUALITY | |
| 2 | EEE | 1 | 2005/11/05 | 19:00 | 19:30 | HIGH QUALITY | ● |
| 3 | FFF | 6 | 2005/11/05 | 21:00 | 22:54 | STANDARD | |
| 4 | GGG | 6 | 2005/11/05 | 22:00 | 22:54 | STANDARD | |
| 5 | HHH | 8 | 2005/11/05 | 19:00 | 20:00 | STANDARD | |

C9 SET

| TITLE | RECORDING DURATION | RECORDING METHOD | RECORDING DATE AND TIME | CHECK |
|---|---|---|---|---|
| AAA | 1 HOUR 50 MINUTES AND 25 SECONDS | MPEG4 | 2002/8/10  19:00 | ● |
| BBB | 1 HOUR 00 MINUTES AND 00 SECONDS | MPEG4 | 2002/10/10  9:02 | |
| CCC | 25 MINUTES AND 30 SECONDS | MPEG2 | 2002/11/11  20:01 | |

COPYING FROM THE REMOVABLE MEDIUM

C1 C2 C3 C4 C5 C6

COPY

FIG. 8

PROGRAM RECORDING RESERVATION SYSTEM, RECORDING APPARATUS, AND CONTROLLER APPARATUS

CROSS REFERENCES TO RELATED APPLICATIONS

The present invention contains subject matter related to Japanese Patent Application JP 2005-313418 filed in the Japanese Patent Office on Oct. 27, 2005, the entire contents of which are incorporated herein by reference.

BACKGROUND OF THE INVENTION

1. Field of the Invention

The present invention relates to a program recording reservation system capable of performing an appropriate program recording reservation operation in order to record programs, to a recording apparatus capable of recording content, and to a controller apparatus capable of transmitting a control signal to set recording reservations for programs.

2. Description of the Related Art

In recent years, as a result of the advancement of information technology, a technology has come to be used in which a plurality of electronic apparatuses in a house are interconnected with one another over a network such as a LAN (Local Area Network), so that information is shared and managed among the electronic apparatuses.

As recording apparatuses capable of recording television broadcasts, HDD (Hard Disk Drive) recorders, which are large-capacity recording media, have been put into practical use. Since the recording capacity of an HDD recorder is as much as several hundred gigabytes, it is possible to record programs for a long duration. Furthermore, since HDD recorders have superior random search performance, they have become widely used in homes.

There is a known program recording reservation system in which recording reservations of programs are set in advance, and specified content is recorded on a recording medium when a set time is reached. Such a program recording reservation system is constituted by, for example, an HDD recorder, and can record content having a large amount of data, such as moving images, audio and the like by incorporating a large-capacity recording medium such as an HDD therein or by connection to an external network. Furthermore, recently, various kinds of removable media have been provided as removable storage media. Then, by storing photographs and moving images captured using, for example, a digital still camera, and music imported from a computer apparatus on a removable medium and by connecting the removable medium to a program recording reservation system, it has become possible for a user to copy photographs, moving images, music files and the like to an HDD recorder. It is also possible to reproduce a copied photograph, a moving image, or an audio file in order to display it on a television receiver connected to the HDD recorder and in order to output audio.

In Japanese Unexamined Patent Application Publication No. 2005-244372 (FIG. 1), there is disclosed a technology for performing a recording reservation setting operation by coordinating operations of information processing apparatuses having a program recording reservation function, which are connected over a network.

In Japanese Unexamined Patent Application Publication No. 2005-244576 (FIG. 1), there is disclosed a technology for performing a program recording reservation operation in each of a plurality of apparatuses set in separate locations by suitably coordinating operations among two or more information processing apparatuses.

SUMMARY OF THE INVENTION

In a program recording reservation system of the related art, when a recording reservation is made once, the remaining recording capacity of a recording medium is not confirmed thereafter. For this reason, when a user performs a recording operation, a file copying operation or the like, which is not related to a recording reservation of a program which consumes the remaining recording capacity of a recording medium, there are cases in which the remaining recording capacity of the recording medium becomes insufficient when the recording reservation time arrives, and thus the reserved program cannot be recorded completely.

It is also possible to connect an HDD recorder to a network line and possible to perform an operation on targeted content via a network. However, when such an HDD recorder connected to a network is used, there is a case in which, even if the user does not perform an operation on the HDD recorder, the remaining recording capacity of the recording medium is consumed as a result of content being copied from another apparatus via the network. For this reason, there is a case in which, when the recording reservation time arrives, the remaining recording capacity of the recording medium becomes insufficient.

The present invention has been made in view of such circumstances. It is desirable to make a notification to a user when the remaining recording capacity of a recording medium is insufficient so as to prompt a user to take appropriate actions.

According to an embodiment of the present invention, there is provided a program recording reservation system including: a recording apparatus including a recorder for recording broadcast programs; and a remote controller for setting a recording reservation for a broadcast program to be recorded by the recorder of the recording apparatus, wherein there are provided a recording management section for obtaining a remaining recordable capacity of the recorder, an average recording bit rate for each of a plurality of recording modes, a recording duration of a program that is scheduled to be recorded in the recorder, and the recording mode of the program when a predetermined operation is to be performed, for computing a necessary recording capacity on the basis of the recording duration, the recording mode, and the average recording bit rate for each program that is scheduled to be recorded, for comparing the total sum of the necessary recording capacities of programs that are scheduled to be recorded with the remaining recordable capacity of the recorder, and for allowing the predetermined operation to be continued when the total sum of the necessary recording capacities is less than the remaining recordable capacity; a display section for displaying a message of an insufficient remaining recordable capacity of the recorder and a first choice for stopping the recording, a second choice for editing or deleting registered recording reservations, and a third choice for continuing the recording when the total sum of the necessary recording capacities is greater than or equal to the remaining recordable capacity; and an operation section for stopping the predetermined operation when the first choice is selected from among the first to third choices displayed on the display section, for editing or deleting a program that is scheduled to be recorded when the second choice is selected, and for continuing the predetermined operation when the third choice is selected.

As a result of the above, the recording capacity necessary to record all the programs for which reservations have been made is calculated, and a notification is made when the remaining recording capacity of the recording medium is insufficient or the remaining recording capacity thereof is likely to become insufficient. Consequently, it becomes possible to take actions, such as stopping an operation currently being performed, which consumes the capacity of the recording medium, or changing the reservation of one or more programs to be recorded.

According to an embodiment of the present invention, the recording capacity necessary for recording for all the reservations that have been set is calculated. When the remaining recording capacity of the recording medium is insufficient or the remaining recording capacity thereof is likely to become insufficient, a warning message is issued. It becomes possible to take actions, such as stopping an operation currently being performed, which consumes the capacity of the recorder or changing or deleting the reservation of one or more programs to be recorded. Therefore, there is an advantage that a decrease in the remaining recording capacity of the recorder can be prevented.

DESCRIPTION OF THE PREFERRED EMBODIMENTS

An embodiment of the present invention will be described below with reference to the accompanying drawings. In this embodiment, as an example, a description will be given of a program recording reservation system in which a recording medium such as a hard disk drive is contained or to which such a recording medium is externally connected, an HDD recorder capable of scheduling video recording and sound recording and a remote controller are interconnected with each other over a network, and another content is to be newly recorded in the HDD recorder in which programs have been scheduled to be recorded, the recording capacity necessary to record programs that have been scheduled to be recorded is compared with the current remaining recordable capacity, and it is possible to prompt a user to take predetermined actions if the remaining recording capacity is insufficient.

Figure 1:
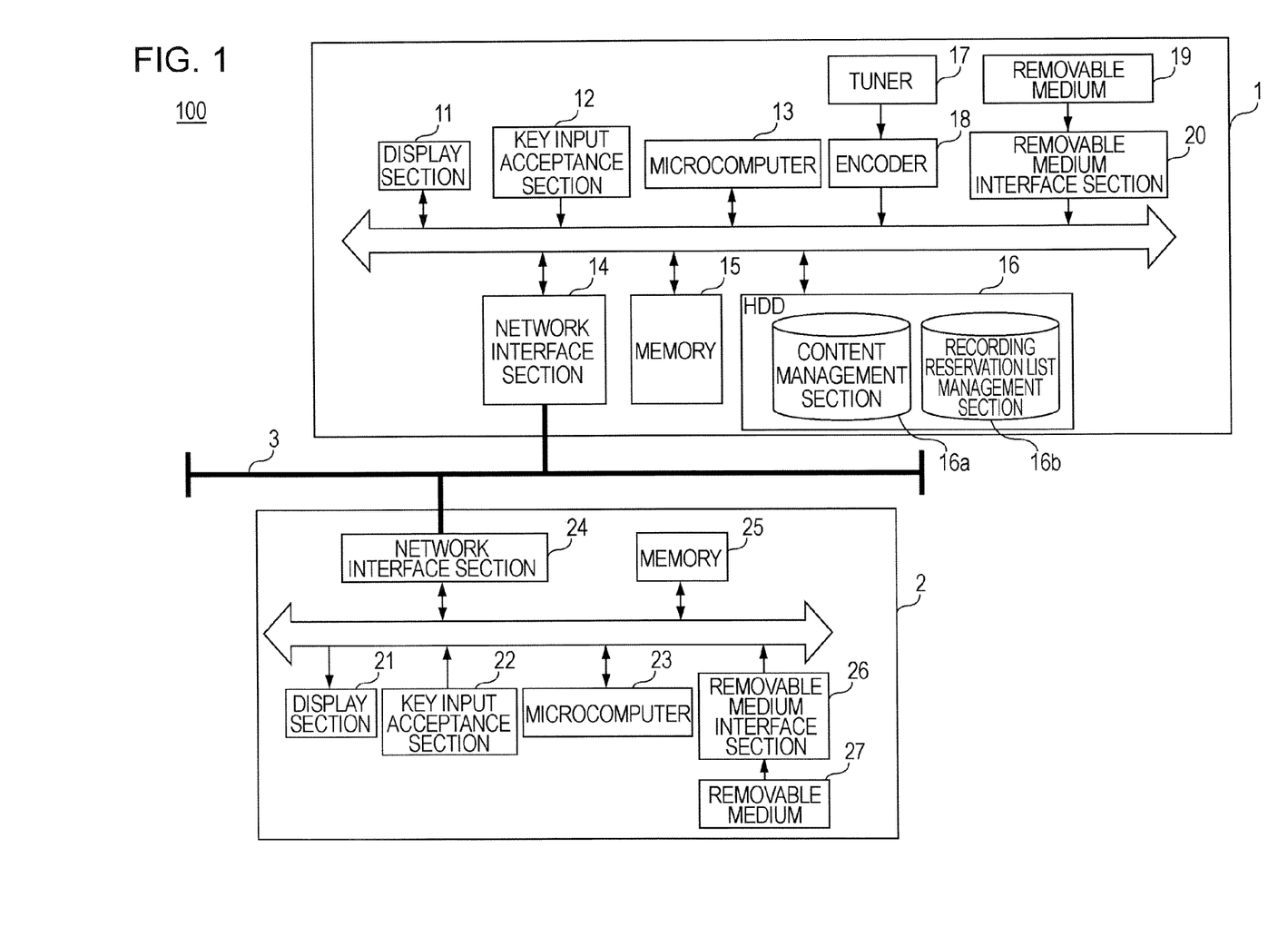
FIG. 1 is a block diagram showing an example of the internal configuration of a program recording reservation system according to an embodiment of the present invention.

First, a description will be given, with reference to FIG. 1, of an example of the configuration of a program recording reservation system according to this embodiment. An HDD recorder 1 having a hard disk drive 16 serving as a large-capacity recording medium, and a remote controller 2 that can be used to remotely control the HDD recorder 1 and that can receive the recording state of the HDD recorder 1, a recording reservation list composed of the reservation date of each recording reservation, the start time thereof, the end time thereof, the channel thereof, the recording mode thereof; the status; error information; and the like, constitute a local area network via a network line 3. Thus, two-direction communication is possible. The system configured in this manner is referred to as a program recording reservation system 100. The HDD recorder 1 has functions of supplying program-recording-related information to the remote controller 2 via the network line 3. Furthermore, it is possible for the remote controller 2 to set recording reservations with the HDD recorder 1 via the network. The remote controller 2 having a display section 21 for displaying a message warning of an insufficient remaining recording capacity of the hard disk drive 16, which is obtained from the HDD recorder 1, on a warning screen, so that it is possible to prompt the user to stop video recording, edit or delete a recording reservation, or the like. The network line 3 of this example can be connected to the Internet via a connection section such as a router (not shown), so that various kinds of data can be obtained.

The HDD recorder 1 receives television broadcast waves from an antenna (not shown), and a tuner 17 for performing station selection and tuning operation selects a desired broadcast station. Then, the video and audio signals for the station that is selected are supplied to an encoder 18 for performing an encoding process. The video and audio signals encoded using a predetermined recording mode (for example, one of a high quality mode, a standard play mode, and a long play mode) are recorded in the hard disk drive 16. When the video and audio signals are to be recorded, it is necessary to have an available capacity with which recording is possible in the hard disk drive 16, and this is referred to as a remaining recording capacity. Furthermore, since a plurality of tuners are provided, it is possible to record a plurality of programs simultaneously in the same time period, and the number of programs that can be recorded in this manner is referred to as the number of programs that can be recorded simultaneously. The bit rate during recording differs for each recording mode. The higher the bit rate, the higher quality of recording possible. The average bit rate is recorded for each recording mode of the recorded programs. The average bit rate is recorded as an average value determined from the recording history of the HDD recorder 1, or an appropriate value is recorded as a fixed value for each recording mode.

In the hard disk drive 16 provided in the HDD recorder 1, a content management section 16a for recording the current remaining recording capacity, the number of programs that can be recorded simultaneously in the same time period, and the average bit rate of each recording mode, and a recording reservation list management section 16b for recording the information of a recording reservation list in which programs that have been scheduled to be recorded by the user are configured. A microcomputer 13 for controlling each section inside the HDD recorder 1 in response to user operation from a key input acceptance section 12 having operation keys and buttons or in response to user operation from the remote controller 2 via a network interface section 14 performs a predetermined process. In the HDD recorder 1, date and time information is supplied to the microcomputer 13 from a clock section (not shown) in which date and time are set, so that recording reservation of a program, recording of a program, and the like become possible. In a memory 15, for example, a rewritable RAM (Random Access Memory) is used to temporarily store data. Furthermore, in the memory 15, for example, a read only memory (ROM) is used to store processing programs, parameters, codes corresponding to operation keys, etc.

The microcomputer 13 reads a processing program or the like from the memory 15 in order to execute it, displays processing results on a display section 11 having a liquid-crystal display panel, decodes a video signal or a program recorded in the hard disk drive 16 and outputs video and audio signals to an external interface section 17 in order to display the processing results on the screen of a television receiver (not shown). In a removable medium 19 serving as a removable storage medium, for example, still images, moving images, audio files, and the like are recorded. By inserting the removable medium 19 into a removable medium interface section 20 provided in the HDD recorder 1, it is possible to perform a copying process for reading data and writing the data into the hard disk drive 16.

The remote controller 2 can be used to remotely control the HDD recorder 1 by transmitting a predetermined control signal to the HDD recorder 1. Key code input from each key provided in the key input acceptance section 22 is supplied to a microcomputer 23 for performing internal control of the remote controller 2. In a memory 25, a rewritable RAM is used to temporarily store data. Furthermore, in the memory 25, for example, a read only memory (ROM) is used to store processing programs, parameters, codes corresponding to operation keys, and the like. The microcomputer 23 reads a processing program or the like from the memory 25 in order to executes it, and supplies a predetermined remote control signal to a network interface section 24. In the network interface section 24, a signal received from the HDD recorder 1 is decoded and supplied to the microcomputer 23.

The microcomputer 23 performs control so that the recording reservation information and information on the remaining recording capacity of the hard disk drive 16 are received from the HDD recorder 1 and a reservation setting screen and a screen for warning of an insufficient capacity are displayed on the liquid-crystal display panel of the display section 21. Similarly to the HDD recorder 1, a removable medium 27 serving as a removable storage medium can be loaded into the remote controller 2. On the removable medium 27, for example, still images, moving images, and audio files are recorded. By inserting the removable medium 27 into a removable medium interface section 26 provided in the remote controller 2, data is read. The read data is sent to the HDD recorder 1 via the network interface section 24. Thus, a copying process for writing the data into the hard disk drive 16 can be performed.

Figure 2:
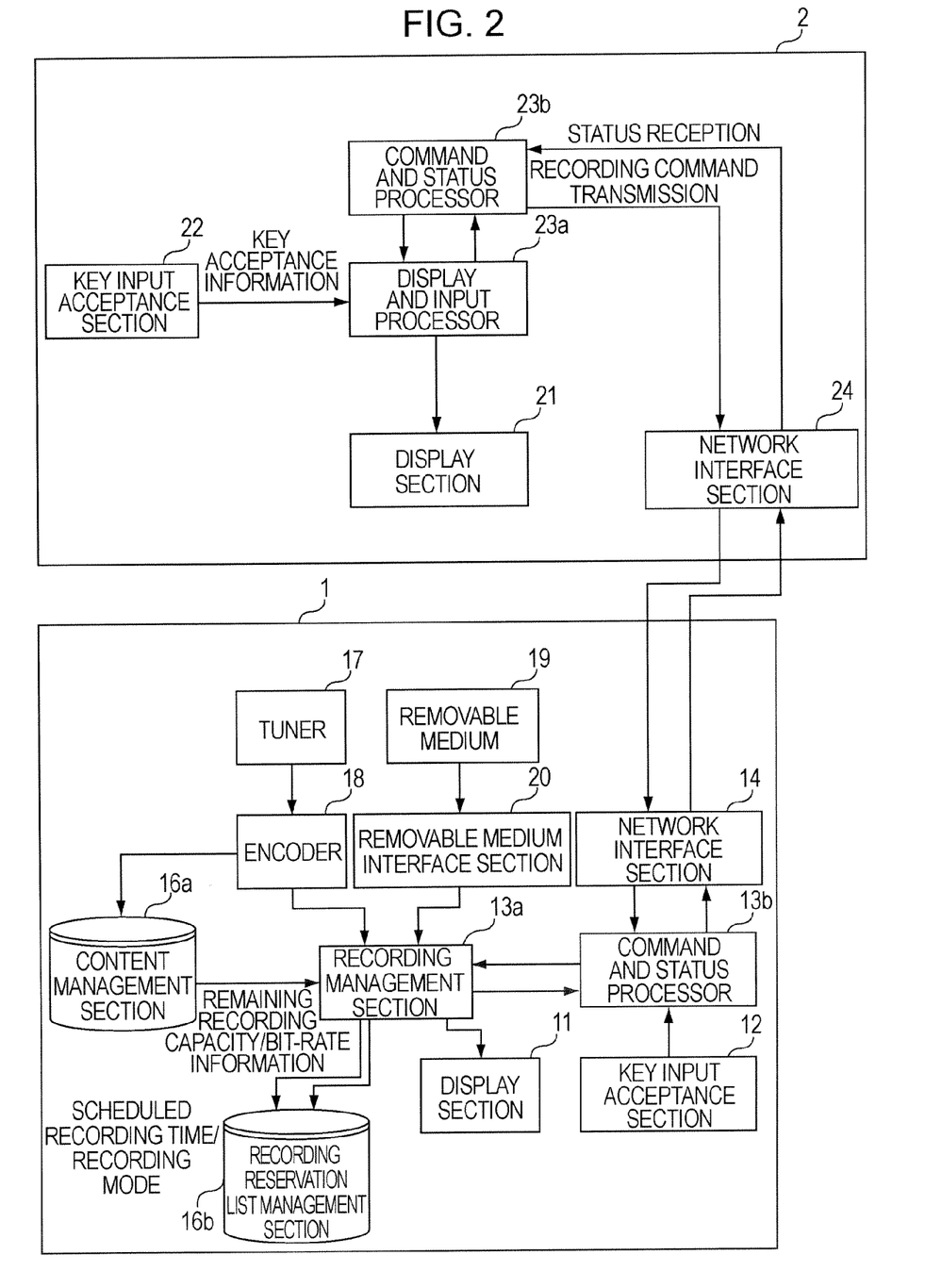
FIG. 2 is a block diagram showing an example of the internal configuration of the program recording reservation system according to the embodiment of the present invention.

Next, a description will be given, with reference to FIG. 2, of an example of the configuration when viewed in terms of the functions of the program recording reservation system 100 according to this embodiment. In the program recording reservation system 100, video and audio recording of programs specified using the remote controller 2, and data recording by a file copying process from the removable medium 19 are performed.

<Configuration for Specifying Video Recording Using Remote Controller>

First, a description will be given of the configuration for video and audio recording of programs specified using a remote controller. When video recording is to be initiated using the remote controller 2, first, the user specifies a video recording command for instructing the starting of video recording using the remote controller 2 via the key input acceptance section 22. Then, key acceptance information is supplied to a display and input processor 23a for controlling the display section 21 and the key input acceptance section 22. In the display and input processor 23a, the key acceptance information is supplied to a command and status processor 23b for creating a video recording command and for receiving and interpreting various statuses from the HDD recorder. The command and status processor 23b creates a video recording command in a predetermined format and sends the video recording command to the HDD recorder 1 via the network interface section 24.

In the HDD recorder 1, the command and status processor 13b for accepting a user command or information on various statuses accepts a video recording command via the network interface section 14. Then, the content of the video recording command is sent to a recording management section 13a for managing the recording area of the hard disk drive 16 according to the scheduled video recording and the remaining recording capacity. In the recording management section 13a, a recording reservation list indicating programs to date that have been scheduled to be recorded is obtained from the recording reservation list management section 16b, and the average bit-rate information of each recording mode is obtained from the content management section 16a. On the basis of these pieces of information, the recording management section 13a calculates the total sum of the necessary recording capacities necessary for performing recording for all the recording reservations and a copying capacity necessary for a copying process.

Then, encoding of a broadcast station selected by the tuner 17 is started in an encoder 18. A received signal encoded by the encoder 18 is supplied to the content management section 16a, and is recorded in the hard disk drive 16. Furthermore, the recording management section 13a constantly obtains information on the remaining recording capacity of the hard disk drive 16 from the content management section 16a. When the remaining recording capacity is small, status information is created by the command and status processor 13b, and the status is sent from the network interface section 14 to the remote controller 2. In the remote controller 2, the command and status processor 13b receives the status via the network interface section 24. Then, the status is sent to the display and input processor 23a, and a warning message of an insufficient remaining recording capacity is displayed on the display section 21.

<Configuration in File Copying Using Removable Medium>

Next, a description will be given of the configuration with which a file is copied from the removable medium 19 and is recorded in the hard disk drive 16. The user selects a file copying process from the key input acceptance section 12. Then, the accepted key input information is supplied to the command and status processor 13b for accepting a user command or various kinds of status information, and a request for performance of a copying process is sent to the recording management section 13a for managing the recording area of the hard disk drive 16 on the basis of the reservation recording and the remaining recording capacity. The recording management section 13a obtains file information from the removable medium 19 loaded into the HDD recorder 1 via the removable medium interface section 20 in order to determine the capability or incapability of recording. At the same time, recording reservation list information indicating programs for which recording reservations have been made is obtained from the recording reservation list management section 16b, and the average bit-rate information of each recording mode is obtained from the content management section 16a. On the basis of these pieces of information, the recording management section 13a calculates the total sum of the recording capacities necessary for performing recording for all the recording reservations and a copying capacity necessary for a copying process.

Then, the recording management section 13a obtains information on the remaining recording capacity from the content management section 16a, and compares the remaining recording capacity with the total sum of the necessary capacities. When the remaining recording capacity is sufficient or when the copying process is to be performed in spite of the insufficient remaining recording capacity, a process for copying a file from the removable medium 19 to the content management section 16a via the recording management section 13a is performed. On the other hand, if the remaining recording capacity is insufficient, a warning message indicating that the remaining recording capacity is insufficient is displayed on the display section 11 of the HDD recorder 1. The warning message at this time may also be displayed on the display screen of a television receiver (not shown) or the like connected to the HDD recorder 1.

<Example of Processing of Specifying Video Recording Using Remote Controller>

Figure 3:
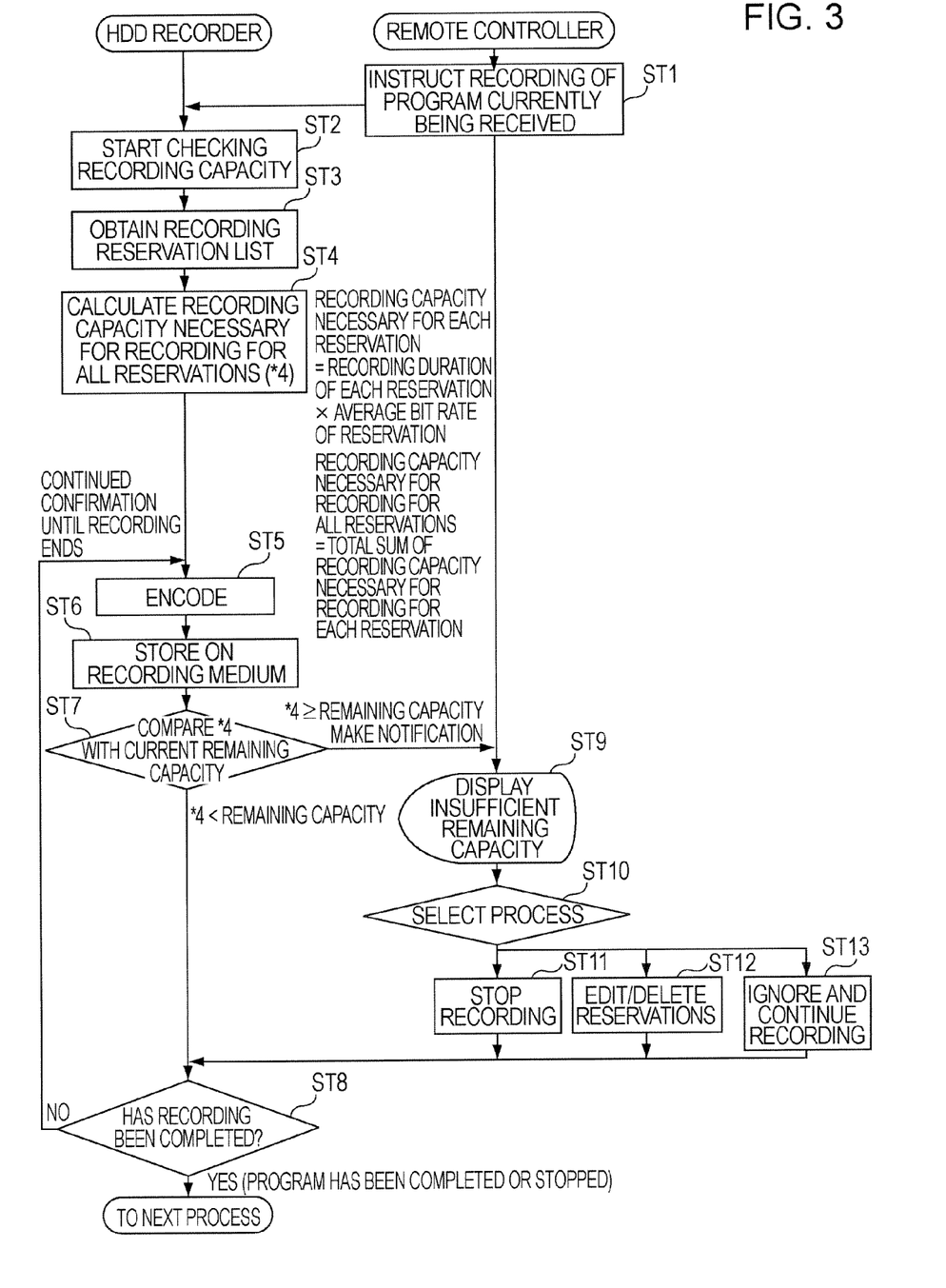
FIG. 3 is a flowchart showing an example of processing of instructing a recording of a program using a remote controller according to an embodiment of the present invention.

Next, a description will be given, with reference to FIG. 3, of an example of processing of the HDD recorder 1 and the remote controller 2, performed when the recording of a program of a channel currently being received is instructed using the remote controller 2. FIG. 3 is a flowchart showing an example of a process for instructing recording of a program using the remote controller 2.

Initially, in order to record a channel currently being received using the HDD recorder 1, the user operates the key input acceptance section 22 of the remote controller 2 and sends a video recording command to the HDD recorder 1 (step ST1). In the HDD recorder 1, thereafter, the recording capacity of the hard disk drive 16 is continuously checked until the video recording is completed (step ST2).

Next, a recording reservation list is obtained from the recording reservation list management section 16b (step ST3). Then, the recording capacity necessary for performing recording for all the registered reservations is calculated using the following equations (step ST4).

The recording capacity necessary for each recording reservation=(the recording duration of each recording reservation)×(the average bit rate of the recording mode specified for each recording reservation)

The recording capacity necessary for performing recording for all the reservations=(the total sum of the recording capacities necessary for performing recording for all the reservations)

Then, video recording begins. A signal received from the tuner 17 is sequentially encoded by the encoder 18 (step ST5) and is stored in the hard disk drive 16 (step ST6). The current remaining recording capacity of the hard disk drive 16 is compared with the recording capacity necessary for performing recording for all the reservations (step ST7).

When the remaining recording capacity of the hard disk drive 16 becomes less than the recording capacity necessary for performing recording for all the reservations during video recording, a message indicating that the remaining recording capacity is insufficient is displayed on the display section 21 of the remote controller 2 (step ST9). At this time, on the display section 21, a warning message of FIG. 4 (to be described later) is displayed, and the user selects an action to be taken (step ST10).

When "Stop video recording being performed" is selected (step ST11), the video recording process is stopped. When "Edit or delete recording reservations" is selected (step ST12), a recording reservation list is displayed, so that an editing operation for lowering the recording mode for the registered reservation or for shortening the recording duration, or an operation for deleting a recording reservation is performed to increase the recording capacity necessary for performing recording for all the reservations. When "Ignore and continue video recording" is selected (step ST13), the video recording process is continued, but since the remaining recording capacity of the hard disk drive 16 decreases, the video recording of the program will be stopped in the middle thereof.

On the other hand, when the current remaining recording capacity of the hard disk drive 16 is larger than the recording capacity necessary for performing recording for all the reservations, the video recording process is continued. Then, a determination is made as to whether the video recording is completed (step ST8). For example, when the program being recorded is completed or when the user determines the stoppage of the video recording, the video recording process is completed. On the other hand, when the video recording is not to be completed, the encoding of a received signal in steps ST5 to ST7 and a process for storing data in the hard disk drive 16 and for comparing the current remaining recording capacity with the recording capacity necessary for performing recording for all the reservations are repeated until the video recording ends.

Figure 4:
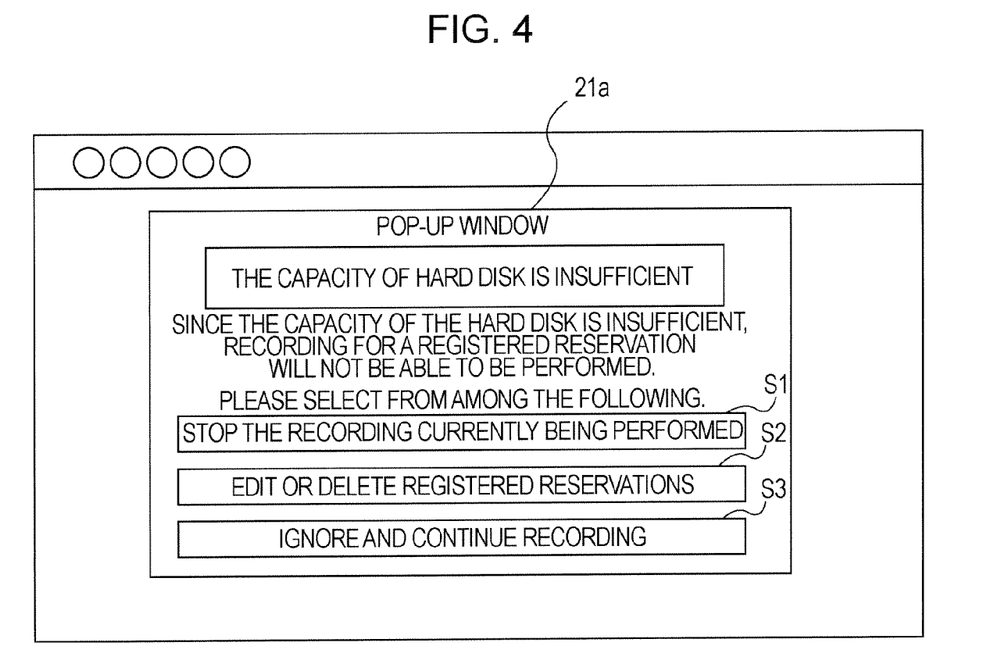
FIG. 4 is an illustration showing an example of the display of a warning screen of an insufficient remaining recordable capacity according to an embodiment of the present invention.

A description will now be given, with reference to FIG. 4, of an example of a screen display when the remaining recording capacity of the hard disk drive 16 becomes insufficient in the process of program recording using the remote controller 2. FIG. 4 shows an example of a warning screen that is displayed when the remaining recordable capacity of the hard disk drive 16 is insufficient in the flowchart of FIG. 3.

On the display section 21 of the remote controller 2, a pop-up window 21a containing a warning message and choices of action is displayed on the screen for the operation currently being performed. In the warning message of this example, a main message is displayed as "The capacity of the hard disk is insufficient". A sub-message is displayed as "Since the capacity of the hard disk is insufficient, recording for a registered reservation will not be able to be performed. Please select a choice from the following.", and choices s1 to s3 for prompting the user to select performance of a process are displayed. For the choice s1, "Stop video recording being performed" is displayed. For the choice s2, "Edit or delete registered reservations" is displayed. For the choice s3, "Ignore and continue video recording" is displayed. The user selects performance of the desired process. Here, there is a case in which a warning message of an insufficient capacity is displayed while a program that has been scheduled to be recorded is being recorded. In addition, the video recording of the program that is being recorded (recording for the reservation is being performed) can also be cancelled.

Figure 5:
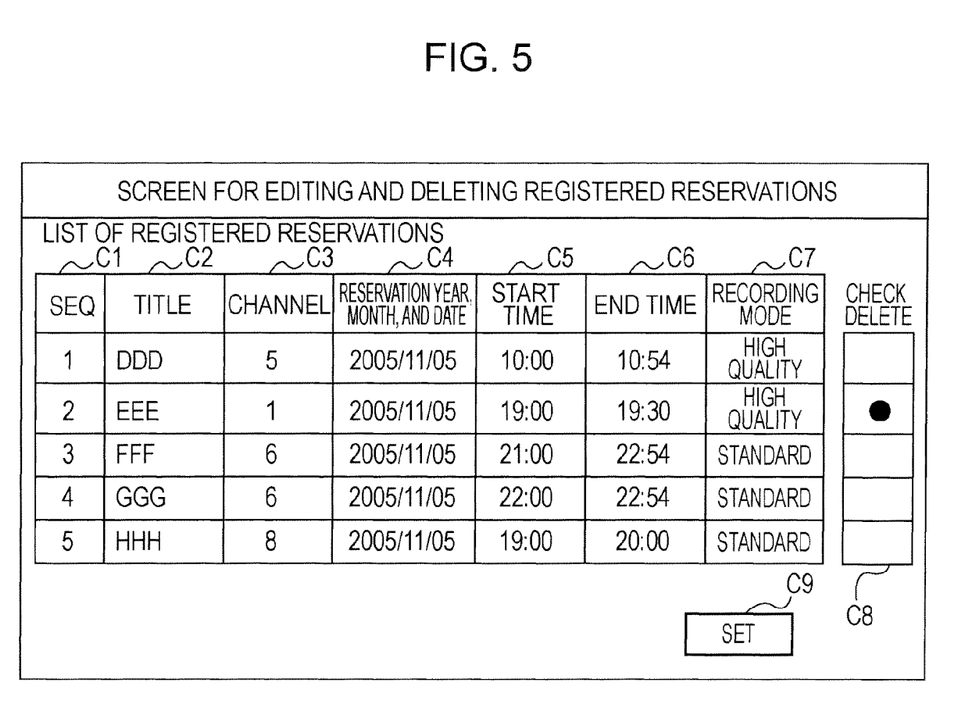
FIG. 5 is an illustration showing an example of the display of a screen for editing or deleting registered reservations according to an embodiment of the present invention.

Here, when the user selects "Edit or delete registered reservations" of choice s2, the display shifts to the screen for editing or deleting registered reservations. FIG. 5 shows an example of the display of a screen for editing or deleting registered reservations. In FIG. 5, a list of registered reservations is displayed as a list of programs that have been scheduled to be recorded.

The screen for editing and deleting registered reservations is displayed on the display section 21 of the remote controller 2. A column c1 in the screen for editing or deleting registered reservations indicates a recording reservation number. A column c2 indicates the title of a program that is scheduled to be recorded. A column c3 indicates the channel of a broadcast station. A column c4 indicates year, month, and date of a reservation. A column c5 indicates a recording start time. A column c6 indicates a recording end time. A column c7 indicates a recording mode in which reserved content of a desired program can be edited. When a "Check delete" button of a button c8 is selected and a "Set" button of a button c9 is depressed, the recording reservation of the checked program is deleted. As a result, the recording capacity necessary for performing recording for all the reservations, which is computed in the example of the processing of recording of a program using the remote controller 2 of FIG. 3, is decreased, and the remaining recording capacity of the hard disk drive 16 is increased. Similarly, for example, by shortening the recording duration (the end time–the start time) in the list of registered reservations or by lowering the recording mode from the high quality mode to a standard mode, the recording capacity necessary for performing recording for all the reservations is decreased, and thus the remaining recording capacity of the hard disk drive 16 can be increased.

<Example of a File Copying Process Using a Removable Medium>

Figure 6:
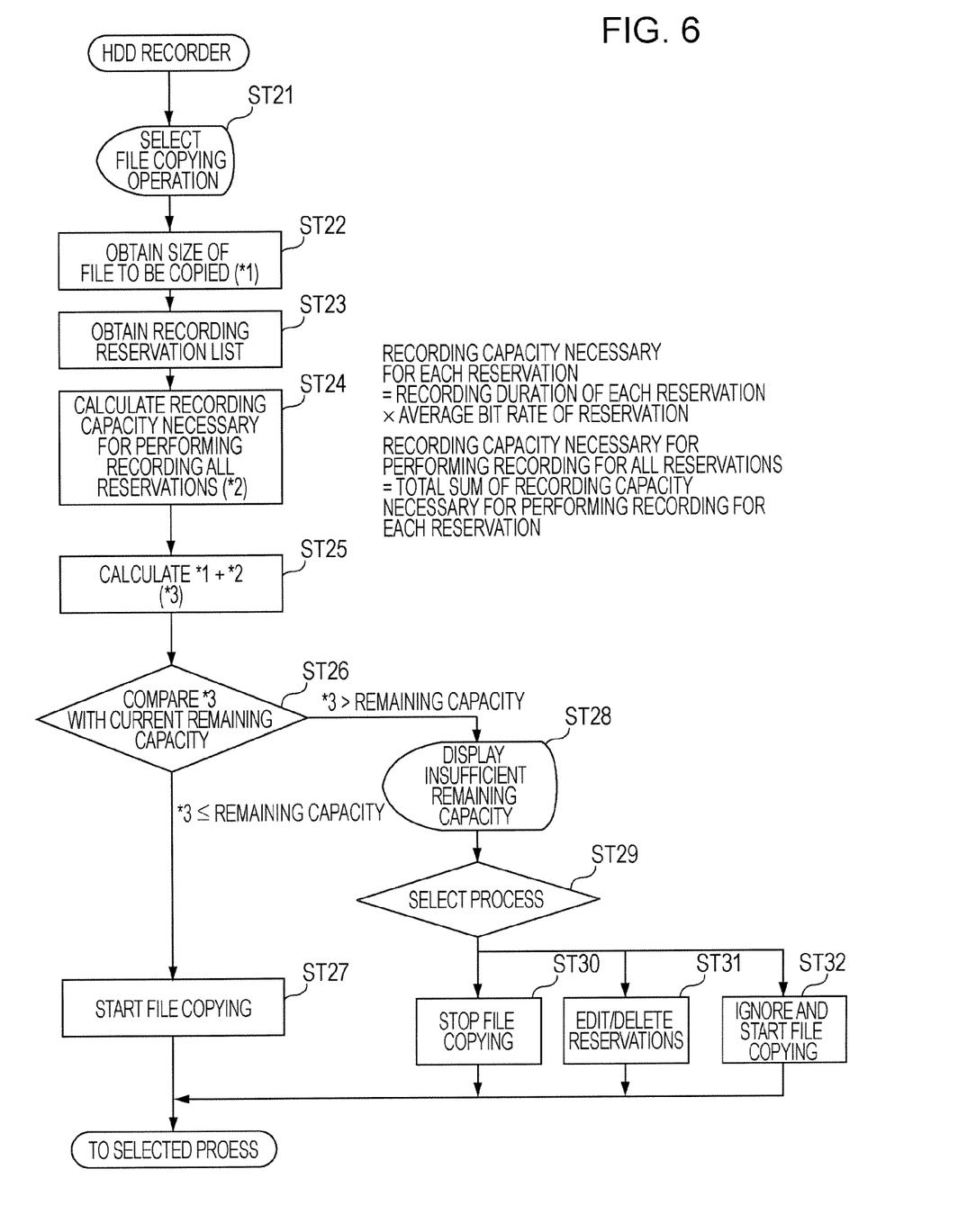
FIG. 6 is a flowchart showing an example of processing of copying a file from a removable medium according to an embodiment of the present invention.

Next, a description will be given, with reference to FIG. 6, of an example of processing of the HDD recorder 1 when a file copying process is performed from the removable medium 19 to the HDD recorder 1. FIG. 6 is a flowchart showing an example of performing a file copying process from the removable medium 19 by using the HDD recorder 1.

Figure 7:
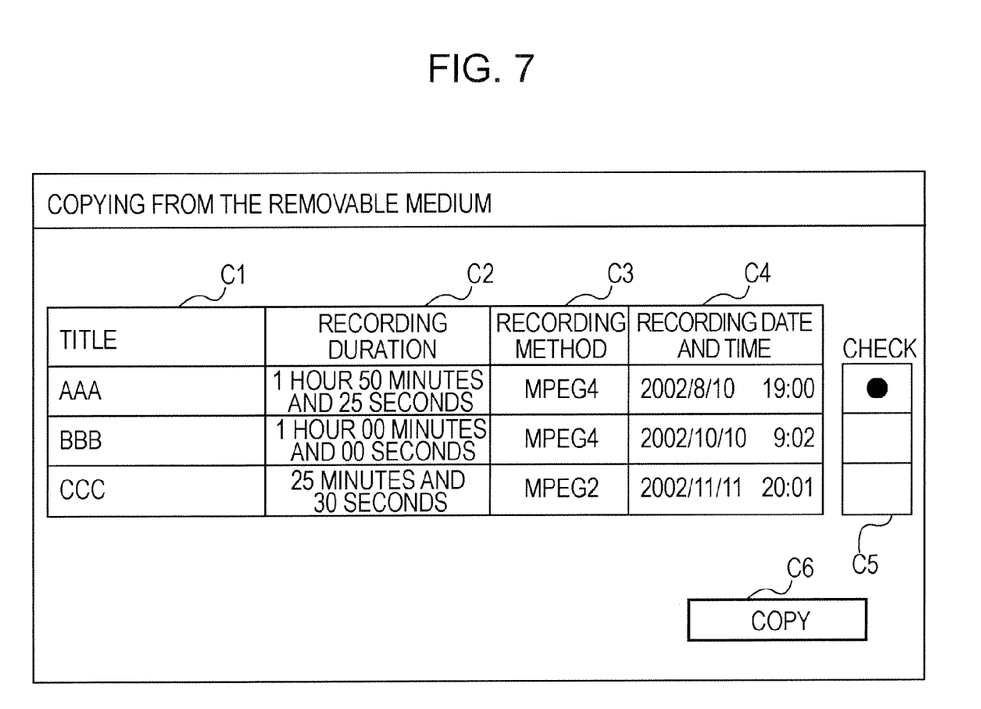
FIG. 7 is an illustration showing an example of the display of a copying screen (content selection) according to an embodiment of the present invention.

Initially, on the display section 11 of the HDD recorder 1, "Copying from a removable medium" of FIG. 7 (to be described later) is displayed. The user applies a check mark to content desired to be copied and selects a "Copy" button (step ST21). Then, a process for copying a file from the removable medium 19 to the HDD recorder 1 is started.

The HDD recorder 1 obtains a file size of the content to be copied from the removable medium 19 (step ST22). Then, a recording reservation list is obtained from the recording reservation list management section 16b, and the recording capacity necessary for performing recording for all the reservations is determined on the basis of the following equations (step ST24).

The recording capacity necessary for each reservation= (the recording duration of each reservation)×(the average bit rate of a specified recording mode)

The recording capacity necessary for performing recording for all the reservations=(the total sum of recording capacities necessary for each reservation)

Then, by considering the size of the file to be copied from the removable medium 19, which is obtained in step S22, the necessary recording capacity is determined on the basis of the following equation (step ST25).

The necessary recording capacity=(the recording capacity necessary for performing recording for all the reservations)+(the size of the file to be copied from the removable medium 19)

Then, the current remaining recording capacity of the hard disk drive 16 is compared with the calculated necessary recording capacity (step ST26). When the remaining recording capacity of the hard disk drive 16 is smaller than or equal to the recording capacity necessary for performing recording for all the reservations, a message of an insufficient remaining recording capacity is displayed on the display section 11 of the HDD recorder 1 (step ST28). At this time, on the display section 11, a warning message of FIG. 8 (to be described later) is displayed, and the user selects a predetermined action (step ST29).

When "Stop file copying" is selected (step ST30), the video recording process is stopped. When "Edit or delete registered reservations" is selected (step ST31), the recording reservation list is displayed, so that the recording capacity necessary for the file copying process is increased by performing an editing operation for lowering the recording mode or shortening the recording duration with respect to registered reservations or by performing a deletion operation for deleting registered reservations. When "Ignore and start copying" is selected (step ST32), the file copying process is started. However, since the remaining recording capacity of the hard disk drive 16 decreases, the file copying process will be stopped in the middle thereof. On the other hand, when the current remaining recording capacity of the hard disk drive 16 is larger than the recording capacity necessary for performing recording for all the reservations, the file copying process is started (step ST27).

Next, a description will be given, with reference to FIG. 7, of an example of the display of a screen for selecting content to be copied in a file copying process using a removable medium. FIG. 7 shows an example of the display of a screen for selecting content when a file copying process from the removable medium 19 is to be performed in the flowchart in FIG. 6.

A content selection screen is displayed on the display section 11 of the HDD recorder 1. A column c1 of the content selection screen indicates the title of content recorded on the removable medium 19. A column c2 indicates a recording duration. A column c3 indicates a recording method. In a column c4, recording dates and times are displayed in a list. A column c5 indicates an option button to which any desired content can be specified. When a "Copy" button of a button c6 is selected, the content specified at the column c5 can be copied to the hard disk drive 16.

Figure 8:
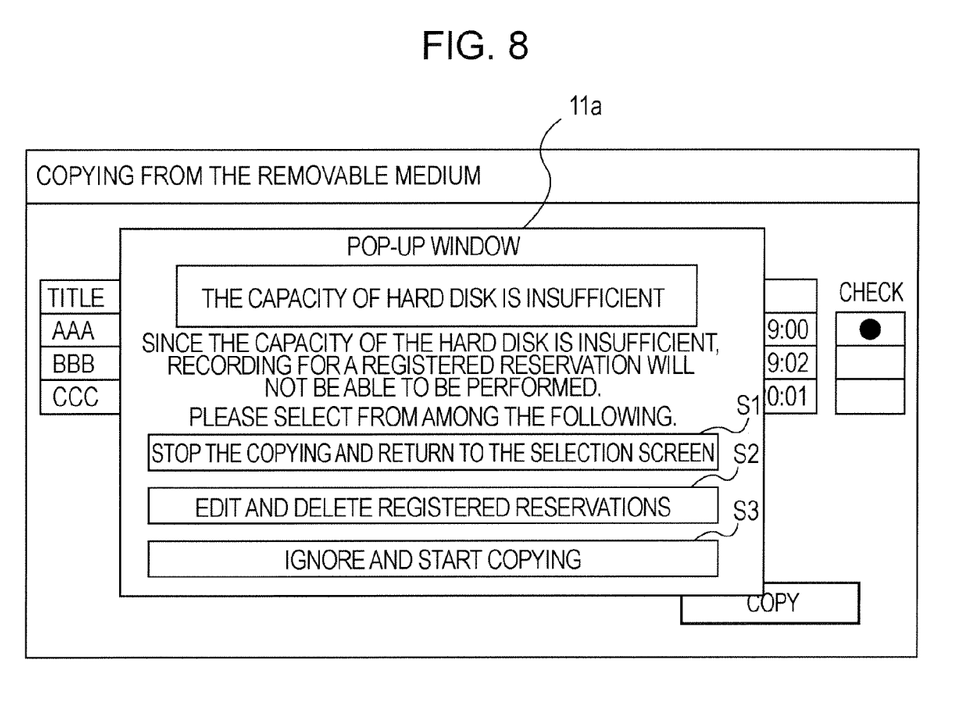
FIG. 8 is an illustration showing an example of the display of a copying screen (insufficient capacity warning) according to an embodiment of the present invention.

A description will now be given, with reference to FIG. 8, of an example of the display of a screen when the remaining recording capacity of the hard disk drive 16 becomes insufficient in the file copying process using a removable medium. FIG. 8 shows an example of the display of a warning screen when the remaining recordable capacity of the hard disk drive 16 is insufficient in the flowchart in FIG. 6.

On the display section 11 of the HDD recorder 1, a pop-up window 11a containing a warning message and choices is displayed on the screen for the operation currently being performed. For the warning message of this example, as a main message, "The capacity of the hard disk is insufficient" is displayed. A sub-message is displayed as "Since the capacity of the hard disk is insufficient, recording for a registered reservation will not be able to be performed. Please select from the following.", and choices S1 to S3 for prompting the user to select a process are displayed. For the choice s1, "Stop copying and return to the selection screen" is displayed. For the choice s2, "Edit or delete registered reservations" is displayed. For the choice s3, "Ignore and start copying" is displayed. The user select the process.

Here, when the user selects "Edit or delete registered reservations" of choice s2, the display shifts to the screen for editing or deleting registered reservations. The screen for editing or deleting registered reservations is displayed similarly to that of FIG. 5, and accordingly, descriptions of details of the display content and processing are omitted. However, the screen for editing or deleting registered reservations is displayed on the display section 11 of the HDD recorder 1 or on a display section of a television receiver (not shown) or the like. By editing or deleting a desired recording reservation from the screen for editing or deleting registered reservations, the remaining recording capacity of the hard disk drive 16 can be increased.

In the manner described above, when recording a program or copying a file, when the remaining recording capacity of the recording medium is insufficient, a notification is made to the user, so that the user is prompted to take actions.

According to the embodiment of the present invention, when an operation that consumes the capacity of the recording medium is to be performed, since the remaining recording capacity of the hard disk drive 16 is determined by considering the recording capacity necessary for recording for the reservations, it is possible to confirm in advance that the recording capacity will become insufficient when the recording for the reservation is performed. Consequently, it becomes possible for the user to make a determination as to the continuation of the operation and the cancellation of unnecessary reservations. This brings about an advantage that the possibility of failing in recording because the necessary recording capacity becomes insufficient when performing recording for the reservation is decreased.

When an operation that consumes the capacity of the recording medium is to be performed, there are cases in which the capacity necessary for recording cannot be known in advance, such as when instructing the recording of a program currently being received. However, even in such a case, after the recording capacity necessary for recording for registered reservations is computed, the remaining recording capacity can be continuously determined with the operation that consumes the capacity of the recording medium. Therefore, there is an advantage that the possibility of failing in recording because the necessary recording capacity becomes insufficient is decreased.

There is another case in which an operation that consumes the capacity of the recording medium is performed at a timing that is not intended by the user via a network or the like. In such a case, for example, by confirming the remaining recording capacity of the hard disk drive 16 at a timing at which a predetermined event occurs, such as when the HDD recorder 1 is switched on, when communication between the HDD recorder 1 and the remote controller 2 becomes possible, when an operation for confirming the capability or incapability of the recording is performed by the user, or a fixed period such as a certain duration, a warning message is displayed when the remaining recording capacity is insufficient, so that an action of stopping the current processing can be performed. Furthermore, the remaining recording capacity can also be constantly displayed on the display section 11 or 21 by using a numeric value, an indicator or the like. As a result of the above, it is possible for the user to constantly know the remaining recording capacity of the hard disk drive 16. This brings about an advantage that necessary actions can be taken.

For the process for making a determination as to whether the remaining recording capacity of the hard disk drive 16 is small, for example, there are following cases:

"The current remaining recording capacity–the recording capacity necessary for performing recording for all the reservations" is smaller than or equal to a predetermined ratio of the total capacity of the hard disk drive 16.

"The current remaining recording capacity–the recording capacity necessary for performing recording for all the reservations" is smaller than or equal to a capacity necessary for recording for a predetermined duration.

At this time, for example, when the remaining recording capacity of the hard disk drive 16 becomes 5% or less of the total capacity or when the recordable duration becomes less than one hour, a warning message is issued to prompt the user to take actions. As a result of setting a predetermined numeric value in advance in the manner described above, in a state in which the remaining recording capacity of the hard disk drive 16 is left to a certain degree, it is possible for the user to stop the video recording or the file copying process, to edit or delete recording reservations, or the like with respect to the video recording or the file copying process. Therefore, there is an advantage that a waiting time interval can be granted until the remaining recording capacity of the hard disk drive 16 becomes zero.

In the above-described embodiment, a description has been given of the display section 11 having a function of performing communication via a network and of the remote controller 2 capable of making a recording reservation to the HDD recorder 1 via the network line 3. The above-described embodiment is not limited to such a configuration and may be applied to a program recording reservation system capable of video recording and sound recording by making a recording reservation in advance from the remote controller 2. Furthermore, even if, for example, a cellular phone terminal, a PDA (Personal Digital (Data) Assistant), a computer apparatus or the like is used as a remote controller, the same advantages as those of the above-described embodiment can be obtained.

The functions of the remote controller 2 of the above-described embodiment may be incorporated in the HDD recorder 1. The HDD recorder 1 may obtain program information, and a program table may be displayed on the user interface (UI) screen of the HDD recorder 1 so that a recording reservation is made. Alternatively, a program table may be displayed on an external display device, such as a television receiver connected to the external interface section 17 of the display section 11, so that a recording reservation is made using the remote controller 2. In addition, the remote controller may obtain program information, such as an EPG, so that the user is able to make a recording reservation by selecting the program information. In addition, a recording reservation can also be made by inputting a code value indicating a program to the remote controller.

The file copying process can also be performed by loading the removable medium 27 into the remote controller 2 and by transmitting the read data to the HDD recorder 1. At this time, also, similarly to the above-described embodiment, the sum of the capacity of a file to be copied and the recording capacity necessary for performing recording for all the reservations is compared with the current remaining recording capacity of the hard disk drive 16. If the remaining recording capacity is insufficient, a warning message may be displayed.

In the above-described embodiment, a warning message and actions to be taken are displayed in characters on the pop-up window 11*a* or 21*a*. Alternatively, a predetermined mark or the like may be displayed or a warning sound may be output so as to call attention to the user. Alternatively, when a home network is constructed, information may be unifiedly managed by sending a recording reservation list, a warning message or the like to a server, or a recording reservation list edited in the server may be sent to the HDD recorder.

In the above-described embodiment, a recording reservation of a television broadcast has been described. Alternatively, the embodiment may be used to record a radio broadcast and an Internet program. Since the necessary recording capacity can be compared with the remaining recording capacity if the during of a program that can be received is known in advance, it is possible to appropriately set a recording reservation.

In the above-described embodiment, an HDD recorder is used. The embodiment is not limited to an HDD recorder and may be applied to an apparatus having identical recording functions. In this case, for the recording medium, in addition to a hard disk drive, for example, a non-volatile memory, an optical disc, a magnetic disk, a magnetic tape, or the like may be used. Furthermore, programs may also be recorded or files may also be copied in a recording apparatus that is externally connected via a network.

In the above-described embodiment, it has been described that the network line 3 is wired and the HDD recorder 1, the remote controller 2, and the router 3 have a wired connection. Alternatively, the embodiment can be realized by using infrared communication in two directions or ad-hoc inter-device communication. In addition, as long as information can be communicated mutually via a network using wireless communication, optical communication in two directions, infrared communication or the like, the type of transmission means is not limited. Furthermore, the embodiment can also be realized by using, for example, inter-device communication means, such as RS-232C or a USB (Universal Serial Bus).

It should be understood by those skilled in the art that various modifications, combinations, sub-combinations and alterations may occur depending on design requirements and other factors insofar as they are within the scope of the appended claims or the equivalents thereof.

What is claimed is:

1. A program recording reservation system, comprising:
a recording apparatus including a recorder and a plurality of tuners to simultaneously record a plurality of broadcast programs, the recording apparatus further including a bi-directional network interface to communicate program-recording-related information with a remote controller; and
the remote controller to set a recording reservation for a broadcast program to be recorded by the recorder of the recording apparatus, wherein one of the recording apparatus and the remote controller include a recording management section to
obtain, while recording data based upon a predetermined operation, a remaining recordable capacity of the recorder, a recording reservation list of programs that are scheduled to be recorded by the recorder, and an average recording bit rate for each of a plurality of recording modes,
compute, while recording the data based upon the predetermined operation, a necessary scheduled recording capacity for the programs that are scheduled to be recorded based on the average recording bit rate for each of the plurality of recording modes and the recording reservation list of programs that are scheduled to be recorded, and
while recording the data based upon the predetermined operation, continuously compare the necessary scheduled recording capacity with the remaining recordable capacity of the recorder to provide an indication of insufficient capacity,
one of the recording apparatus and the remote controller include a display section to display a message of insufficient remaining recordable capacity of the recorder and a first choice for stopping the predetermined operation, a second choice for editing or deleting recording reservations, and a third choice for continuing the predetermined operation, based on the indication of insufficient capacity, and
one of the recording apparatus and the remote controller include an operation section to stop the predetermined operation when the first choice is selected, edit or delete the recording reservations when the second choice is selected, and continue the predetermined operation when the third choice is selected.

2. The program recording reservation system according to claim 1, wherein the predetermined operation includes loading a removable external recording medium and storing data recorded on the removable external recording medium to the recorder.

3. The program recording reservation system according to claim 1, wherein the predetermined operation includes recording a moving image and/or audio of a program that is currently being received.

4. The program recording reservation system according to claim 3, wherein the recording management section is further configured to compute a recordable duration by subtracting the necessary scheduled recording capacity from the remaining recordable capacity of the recorder, and the display section is further configured to, when the recording duration becomes less than a predetermined recordable duration during the predetermined operation, display a message indicating that the remaining recordable capacity of the recorder is insufficient.

5. The program recording reservation system according to claim 3, wherein the display section is further configured to, when the remaining recordable capacity of the recorder becomes less than a predetermined ratio of a total capacity of the recorder during the predetermined operation, display a message indicating that the remaining recordable capacity of the recorder is insufficient.

6. The program recording reservation system according to claim 3, wherein the recording management section is further configured to, when a predetermined event occurs, confirm the remaining recordable capacity of the recorder to produce a confirmation result, and the display section is further configured to display the confirmation result.

7. A recording apparatus including a recorder to record a reservation of a broadcast program, the recording apparatus comprising:
the recorder including a plurality of tuners to record a plurality of broadcast programs;
a bi-directional network interface to communicate program-recording-related information with a remote controller;
a recording management section to
obtain, while recording data based upon a predetermined operation, a remaining recordable capacity of the recorder, a recording reservation list of programs that are scheduled to be recorded by the recorder, and an average recording bit rate for each of a plurality of recording modes,
compute, while recording the data based on the predetermined operation, a necessary scheduled recording capacity for the programs that are scheduled to be recorded based on the average recording bit rate for each of the plurality of recording modes and the recording reservation list of programs that are scheduled to be recorded, and
while recording the data based upon the predetermined operation, continuously compare the necessary scheduled recording capacity with the remaining recordable capacity of the recorder to provide an indication of insufficient capacity;

a display section to display a message of insufficient remaining recordable capacity of the recorder and a first choice for stopping the predetermined operation, a second choice for editing or deleting recording reservations, and a third choice for continuing the predetermined operation, based on the indication of insufficient capacity; and an operation section to stop the predetermined operation when the first choice is selected, edit or delete the recording reservations when the second choice is selected, and continue the predetermined operation when the third choice is selected.

8. A controller to set a recording reservation to a recording apparatus including a recorder and a plurality of tuners to record a plurality of broadcast programs, the controller comprising:

a bi-directional network interface to communicate program-recording-related information with the recording apparatus;

a recording management section to
obtain, while recording data based upon a predetermined operation, a remaining recordable capacity of the recorder, a recording reservation list of programs that are scheduled to be recorded by the recorder, and an average recording bit rate for each of a plurality of recording modes,
compute, while recording the data based upon the predetermined operation, a necessary scheduled recording capacity for the programs that are scheduled to be recorded based on the average recording bit rate for each of the plurality of recording modes and the recording reservation list of programs that are scheduled to be recorded, and
while recording the data based upon the predetermined operation, continuously compare the necessary scheduled recording capacity with the remaining recordable capacity of the recorder to provide an indication of insufficient capacity;

a display section to display a message of insufficient remaining recordable capacity of the recorder and a first choice for stopping the predetermined operation, a second choice for editing or deleting recording reservations, and a third choice for continuing the predetermined operation, based on the indication of insufficient capacity; and an operation section to stop the predetermined operation when the first choice is selected, edit or delete the recording reservations when the second choice is selected, and continue the predetermined operation when the third choice is selected.

9. The controller according to claim 8, wherein the message of insufficient remaining recordable capacity is displayed as a pop-up window on the display section of the controller.

10. The controller according to claim 8, wherein the remaining recordable capacity is continuously displayed on the display section of the controller.

11. The controller according to claim 8, wherein the controller further sets recording of audio programs and internet programs on the recording apparatus.

12. The program recording reservation system according to claim 1, wherein the remote controller is one of a personal digital assistant and a cellular phone.

* * * * *